(12) United States Patent
Bedingfield, Sr. et al.

(10) Patent No.: US 6,853,718 B1
(45) Date of Patent: Feb. 8, 2005

(54) SYSTEM AND METHOD FOR EFFICIENT TELEPHONE CALL TRANSFER

(75) Inventors: James C. Bedingfield, Sr., Lilburn, GA (US); Hong Thi Nguyen, Atlanta, GA (US); Sharolyn S. Farmer, Stone Mountain, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 347 days.

(21) Appl. No.: 10/155,959

(22) Filed: May 29, 2002

(51) Int. Cl.[7] ................................................ H04M 3/42
(52) U.S. Cl. ......................... 379/212.01; 379/201.12; 455/414.1
(58) Field of Search ....................... 379/212.01, 211.01, 379/211.02, 215.01, 207.02, 201.01, 201.12, 219; 455/414.1, 417, 455

(56) References Cited

U.S. PATENT DOCUMENTS

| | | | | |
|---|---|---|---|---|
| 5,249,221 A | * | 9/1993 | Ketring ................. | 379/214.01 |
| 5,436,963 A | * | 7/1995 | Fitzpatrick et al. .... | 379/218.01 |
| 6,614,897 B1 | * | 9/2003 | Curtis et al. ........... | 379/210.01 |
| 2002/0034290 A1 | * | 3/2002 | Pershan ................. | 379/207.02 |

* cited by examiner

*Primary Examiner*—Benny Tieu
(74) *Attorney, Agent, or Firm*—Merchant & Gould

(57) ABSTRACT

During a telephone call, a transferring party performs an action to cause the telephone call to be transferred. The action causes a switch to send a query to a service control point (SCP) in a public-switched telephone network (PSTN). The SCP determines a transfer telephone number to which the telephone call is transferred. The transfer telephone number can be stored in a subscriber information table. The SCP determines the transfer telephone number and returns the transfer telephone number to the switch sending the query. The switch makes a telephone call to the transfer telephone number to cause a telephone associated with the transfer telephone number to ring. When the telephone associated with the transfer telephone number is answered, the transferring party disconnects from the telephone call to complete the transfer of the telephone call. A services node can also be used to determine the transfer telephone number. In addition, other telephone services, such as three-way calling can be selected by the transferring party.

37 Claims, 12 Drawing Sheets

SUBSCRIBER INFORMATION TABLE ~130

| SUBSCRIBER | TRANSFER # | ACTIVE |
|---|---|---|
| 4045551234 | 4045552382 | ✓ |
| 4045551397 | 4045553192 | |

FIG. 1A

SUBSCRIBER INFORMATION TABLE ~230

| PHONE # | TRANSFER # | TRANSFER ACTIVE | THREE-WAY CALLING ACTIVE |
|---|---|---|---|
| 4045553552 | 4045553821 | ✓ | ✓ |
| 4045553921 | 4045555936 | ✓ | ✗ |

FIG. 2A

SERVICE NODE TABLE ~319

| AREA CODE | SN # |
|---|---|
| 404 | 5551382 |
| 410 | 5551925 |

FIG. 3A

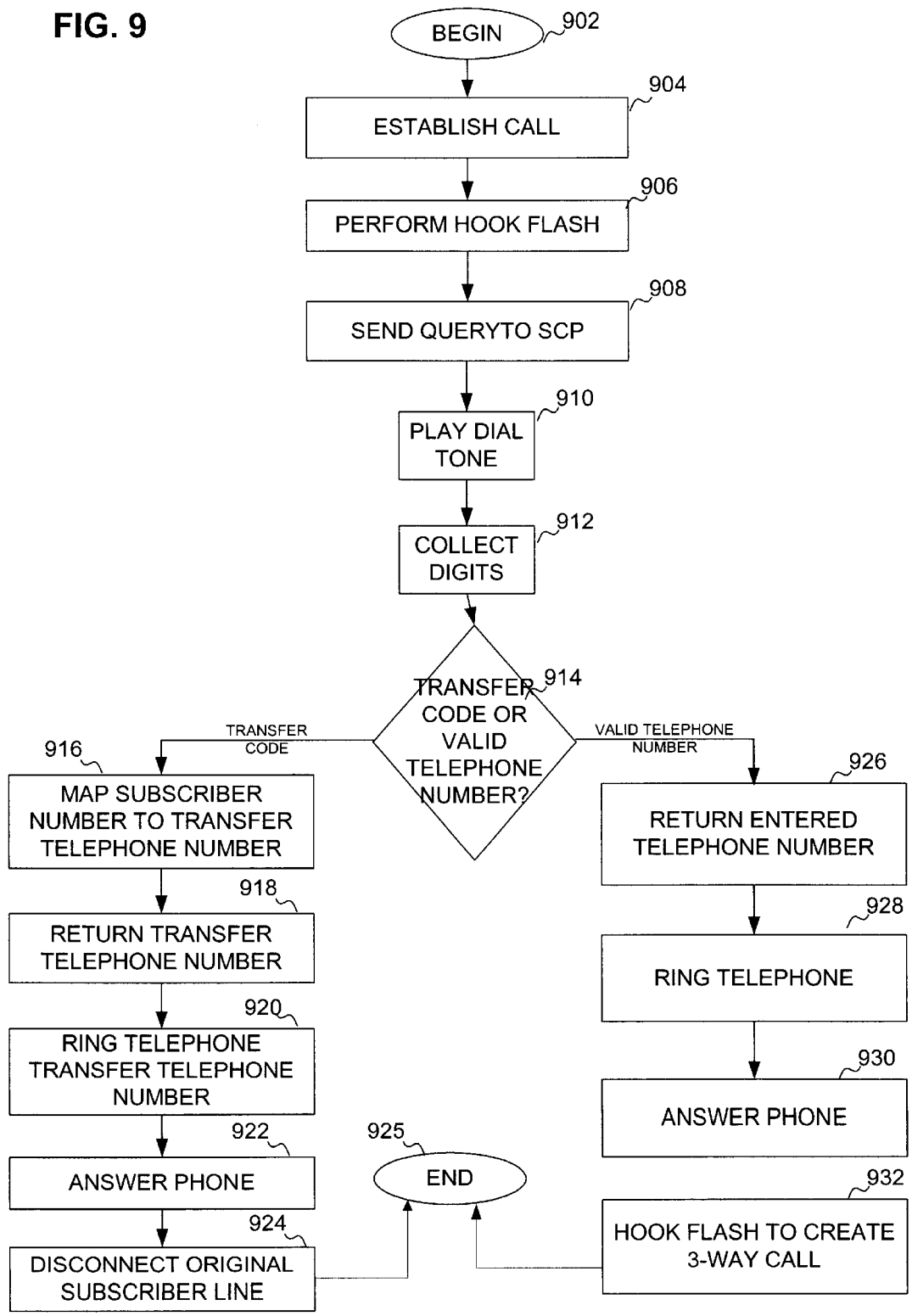

SYSTEM AND METHOD FOR EFFICIENT TELEPHONE CALL TRANSFER

BACKGROUND

1. Field of the Invention

The present invention relates generally to telephone call processing. More specifically, the present invention relates to processing requests to transfer a telephone call in an efficient manner.

2. Background of the Invention

The ability to transfer telephone calls is a common and popular feature in conventional telephone call processing systems. For example, calls to call centers are often transferred to agents who can assist the caller. In another example, a receptionist typically answers telephone calls to an office, and then transfers the calls to the intended party.

With today's ever-increasing use of mobile telephony, the ability to transfer a telephone call from a landline to a cellular telephone is likely to find great use. For example, assume a calling party establishes a telephone call with a called party using a landline telephone in her home. During the telephone conversation one of the parties decides to leave her house, but she does not want to disconnect from the current telephone conversation. If she could subscribe to a transfer service, she could transfer the telephone call from her landline phone to her cellular telephone.

To appreciate the value of the present invention, an understanding of conventional call transfer methods is provided. To perform the transfer the transferring party (for example, the calling party), interrupts the current call. This interruption is typically provided by the transferring party performing a hook flash to signal a switch in a telephone company central office that services the transferring party's telephone that the transferring party desires to perform mid-call processing of the telephone call. In this case, the mid-call processing is transfer of the telephone call. In response to the hook flash, the switch provides a dial tone to the transferring party as a prompt for the transferring party to dial a transfer telephone number. The transfer telephone number is the number to which the telephone call is transferred. After the telephone number is entered, the switch causes the telephone associated with the transfer telephone number to ring. This telephone is answered. If the transferring party thereafter hangs up, the call is successfully transferred. If the transferring party remains on the line, the call becomes a three-way conference call. To remain on the line, the calling party generally performs a hook flash instead of hanging up the telephone.

Another known mechanism for transferring telephone call is by using ISDN-capable telephones. The ISDN implementation is similar in function to the transfer described above. However, control of the transfer is accomplished via out-of-band signaling, rather than by using a hook flash as described above. Typically, a transfer button is provided on the ISDN phone. To transfer an active telephone call using an ISDN telephone, the user typically presses the transfer button. This causes a message to be sent to a central office switch. The switch detects the message and provides a dial tone to the user in response. The dial tone is a prompt to the user to enter a transfer telephone number. The user enters the transfer telephone number. The switch receives the transfer telephone number and causes a call to be completed to that number to cause a telephone associated with the transfer telephone number to ring. When the telephone associated with the transfer telephone number is answered, the user can hang up to complete transfer of the telephone call.

Another type of telephone that can be used to transfer telephone calls is a programmable phone such as an analog display services interface (ADSI) telephone. An ADSI telephone is essentially an analog telephone that has a screen. The screen contains one or more soft buttons. A user can select a soft button to perform a function. One of the buttons can be a transfer button. When the user selects the transfer soft button, the ADSI sends a hook flash to a central office switch. As described above, in response, the switch provides a dial tone to the user as a prompt to enter a transfer telephone number. The switch collects the digits of the transfer telephone number entered by the user and completes a telephone call to a telephone associated with the transfer telephone number, causing the telephone associated with the transfer telephone number to ring. When the ringing telephone is answered, the user of the ADSI telephone typically presses the transfer button again or hangs up the phone to disconnect from the original telephone call, thereby completing transfer of the telephone call to the telephone associated with the transfer telephone number.

At significant drawback associated with conventional mechanisms for transferring telephone calls is that numerous digits must be entered to transfer the telephone call. For example, in many cases at least 10 digits will have to be entered. Dialing numerous digits in this manner can be cumbersome and prone to error.

Another significant problem with conventional transfer of telephone calls is the possibility of transferring a toll call thereby losing control over the duration of the telephone call. For example, if the transferring party transfers a call for which they are paying, they will continue to be billed for the telephone call despite the transfer. Thus, by virtue of transferring the telephone call, the transferring party no longer has control over its duration. This can prove to be inconvenient and costly to the transferring party. For this reason, residential telephone customers are not generally able to order the transfer feature.

SUMMARY OF THE INVENTION

The present invention solves the foregoing problems in the art by transferring the telephone call in response to a simple action by the party desiring to transfer the telephone call. When the transferring party performs the action, the present invention determines a transfer telephone number by accessing a table of pre-stored transfer telephone numbers. Thus, the transferring party does not have to dial numerous digits or remember transfer telephone numbers.

For example, in one embodiment of the present invention, the transferring party need only perform a hook flash to transfer a telephone call. In response to the hook flash, the network determines what telephone number to transfer the telephone call to, and takes the necessary steps to effectuate the transfer.

In another embodiment of the present invention, when the transferring party performs the hook flash, the network presents a dial tone to the transferring party to prompt the transferring party to enter additional information to transfer the telephone call. In response to the dial tone, the transferring party enters a code (e.g., a star code such as *97). When the transferring party enters a code, the telephone call is transferred as described above.

The present invention can also incorporate a network capability to provide a transferring party with a list of possible transfer number from which the transferring party can select the desired transfer telephone number. This gives the transferring party increased flexibility while still maintaining control over the transfer of the telephone call. Thus, the present invention provides an efficient and flexible telephone transfer service that is easier to use and more secure than conventional systems.

In another embodiment, the present invention is a method for transferring a telephone call. The method includes the step of establishing a telephone call between a calling party and a called party. The method continues with the step of detecting an action indicating that a transfer of the telephone call is desired. In response to detecting the action, the method continues with the step of sending a query to determine how to process the telephone call in response to the action. Then, the method continues with the step of using information sent in the query to determine a transfer telephone number to which the telephone call is to be transferred. After, the transfer telephone number is determined, the method continues with the step of returning the transfer telephone number in response to the query. The method then continues with the step of causing a telephone associated with the transfer telephone number to ring. The method continues with the step of disconnecting a party performing the action in step (b) from the telephone call to complete transfer of the telephone call.

In another embodiment, the present invention is a method for transferring a telephone call. The method includes the step of establishing a telephone call between a calling party and a called party. The method continues with the step of detecting an action performed by a party to the telephone call indicating that the party requests a mid-call telephone call service. In response to detection of the action, the method continues with the step of prompting the party performing the action for a selection of the service requested. Then, the method continues with the steps of transferring the telephone call if the party performing the action enters a code associated with a transfer service or performing another telephone call processing service in accordance with the entered code if the calling party does not enter the code associated with a transfer service.

In another embodiment, the present invention is a system for performing an transfer of a telephone call. The system includes a first switch that couples a calling party telephone to a PSTN and a second switch that couples a called party. telephone to a PSTN, wherein a telephone call can be established from the calling party to the called party over the PSTN through the first switch and the second switch. A network element containing service logic, such as an application server (AS) or service control point (SCP) is coupled to one of the first and second switches. A database is coupled to the SCP. The database comprises a subscriber information table. Preferably, the subscriber information table comprises a first column and a second column, wherein the first column is used to store a subscriber identification and the second column is used to store a transfer telephone number associated with the subscriber identification. The SCP is adapted to receive a query for a transfer telephone number from a one of the first and second switches and determine a transfer telephone number to return to the one of the first and second switches in response to the query.

In another embodiment, the present invention is a system for performing an efficient transfer of a telephone call. The context of this invention is one or more interconnected telecommunication networks such as a wireless network, an Internet Protocol (IP) packet network, or a landline PSTN. The following descriptions use the PSTN as an exemplary network. The system includes a first switch that couples a calling party telephone to a PSTN and a second switch that couples a called party telephone to a PSTN, wherein a telephone call can be established from the calling party to the called party over the PSTN through the first switch and the second switch. The system also includes a services node (SN), or Intelligent Peripheral coupled to the PSTN comprising a subscriber information table. Preferably, the subscriber information table comprises two columns, wherein a first column is used to store a subscriber identification and a second column is used to store a transfer telephone number associated with the subscriber identification stored in the first column. The services node is preferably adapted to prompt one of the calling party and the called party that requests a mid-call transfer to enter a code to request transfer of the telephone call. The services node is further adapted to obtain a transfer telephone number to which the telephone call should be transferred and to cause a telephone associated with the telephone transfer number to ring.

BRIEF DESCRIPTION OF THE DRAWINGS

FIG. 1A is an exemplary subscriber information table according to an embodiment of the present invention.

FIG. 2A is another exemplary subscriber information table according to an embodiment of the present invention.

FIG. 3A is an exemplary services node table according to an embodiment of the present invention.

FIG. 9 is an exemplary flow chart illustrating a method for performing an efficient telephone call transfer according to an embodiment of the present invention that allows a service that requires additional information to be entered after a hook flash such as three-way calling to be used along with efficient transfer of telephone

DETAILED DESCRIPTION OF THE INVENTION

Figure 1:
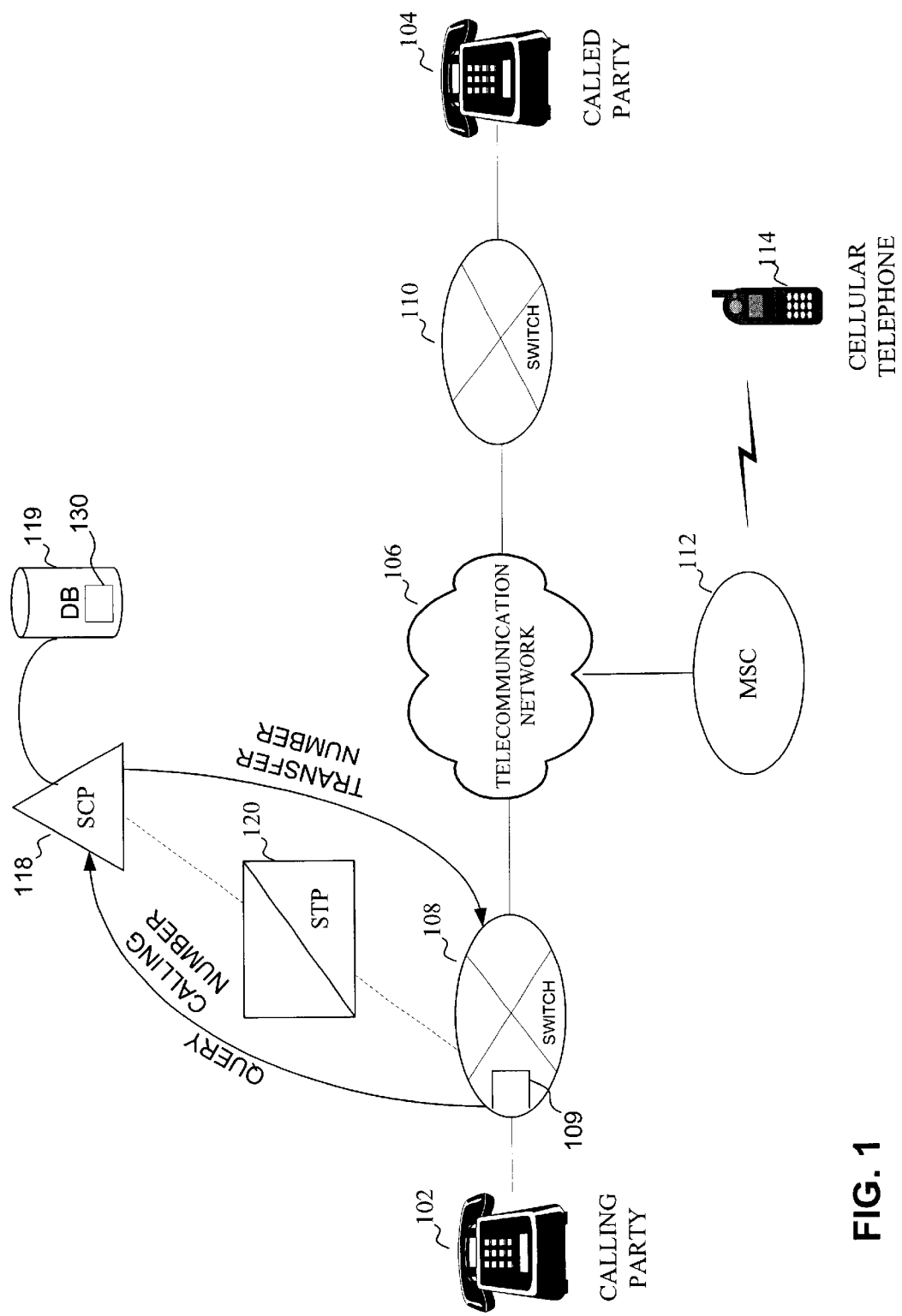
FIG. 1 is a schematic illustration of a system for performing an efficient telephone call transfer according to an embodiment of the present invention.

FIG. 1 is a schematic diagram of a system for performing an efficient telephone call transfer according to a first embodiment of the present invention. A calling party using a calling party telephone 102 establishes a telephone call to a called party using a called party telephone 104. In the embodiment shown in FIG. 1, calling party telephone 102 is an analog telephone, i.e., it does not have ISDN or other capability to interface with a switch using out-of-band messaging. Called party telephone 104 can be any telephone capable of establishing the telephone call including a computer configured to emulate a telephone.

In general, the telephone call is made over a public-switched telephone network (PSTN) 106. Calling party telephone 102 communicates with PSTN 106 through switch 108. Switch 108 provides telephone service to the calling party. Typically, switch 108 is located in a central office of a telephone company and is part of PSTN 106. Alternatively, switch 108 is a premises switch such as a PBX. In the present example, the calling party is a subscriber to the efficient transfer feature of the present invention. Preferably, a mid-call trigger 109 is provisioned in switch 108 on the calling party's telephone line to provide the efficient transfer service of the present invention. Called party telephone 104 communicates with PSTN 106 through a telephone switch 110. Typically, switch 110 is located in a central office and is part of PSTN 106. Alternatively, switch 110 is a premises switch such as a PBX. In addition, as shown in FIG. 1, a cellular telephone user using cellular telephone 114 can communicate with PSTN 106 through a mobile switching center (MSC) 112.

During the telephone call, the calling party (the subscriber) decides to transfer the telephone call to another telephone without terminating the current telephone call. For example, she may want to go out and therefore desires to transfer the telephone call to a cellular telephone 114, without terminating the current telephone call.

To transfer the telephone call according to one embodiment of the present invention, the calling party performs a hook flash using calling party telephone 102. The hook flash provides an indication to switch 108 that the calling party desires to transfer the telephone call. When the calling party performs the hook flash, a midcall trigger 109 is activated. Activation of mid-call trigger 109 causes switch 108 to hold the current telephone call and sends a query to a switch control point (SCP) 118 for instruction on how to handle the hook flash. The query includes the calling party number and an indication that the calling party performed the hook flash.

When it receives the query, SCP 118 determines whether the calling party has a stored transfer number corresponding to the calling party number contained in the query. In one embodiment of the present invention, SCP 118 accesses a subscriber information table 130 to obtain the transfer telephone number. Subscriber information table 130 includes pre-determined transfer telephone numbers corresponding to each subscriber of the efficient transfer service of the present invention. Preferably, these numbers are provided to the service provider by the subscribers. Thus, each subscriber can chose the transfer telephone number to which calls are transferred when they access the efficient transfer service of the present invention.

An exemplary subscriber transfer number table 130 is shown in FIG. 1A. Transfer table 130 preferably has three columns. The first column corresponds to the calling party number (i.e., the subscriber's number). The second column corresponds to the transfer telephone number associated with the calling party number. As described above, this transfer telephone number is preferably provided by the subscriber. The third column is used to store an active/inactive status flag so that the service can be turned off either by the telephone company or by the subscriber. For example, the telephone company may deactivate the service temporarily for unpaid bills. The subscriber may deactivate the service to avoid service conflicts. In one embodiment of the present invention, a subscriber can access the portion of subscriber information table 130 pertinent to that subscriber so that he or she can modify the transfer telephone number and/or active state. For example, such access can be provided by a password controlled web site.

Using the calling party telephone number contained in the query as an index into subscriber table 130, SCP 118 retrieves the transfer telephone number corresponding to the calling party number. SCP 118 returns the transfer telephone number to switch 108 in a response message to the query. Switch 108 performs any necessary actions to cause a telephone associated with the transfer telephone number to ring. When the telephone associated with the transfer telephone number is answered, the calling party hangs up telephone 102 to disconnect from the original telephone call, to complete the transfer of the telephone call.

Thus, the present invention relieves the transferring party from having to dial the transfer telephone number or having to remember it. This is because the transfer telephone number is already stored in subscriber information table 130. Thus, an advantage of the present invention is that it limits the transfer number to a pre-determined number rather than allowing the user to input any telephone number, including a toll number. As a result, the present invention provides a more efficient telephone call transfer service than provided by conventional systems.

In one use, switch 108 communicates with a mobile switching center (MSC) 112 to cause cellular telephone 114 (the calling party's cellular telephone) to ring. The calling party answers cellular telephone 114 and hangs up telephone 102 to disconnect telephone 102 from the telephone call. Disconnecting telephone 102 from the telephone call completes the transfer of the telephone call from telephone 102 to cellular telephone 114.

There is a potential conflict between the first embodiment of the present invention described above in FIGS. 1 and 1A when the subscriber also subscribes to the popular call waiting service. This conflict can occur when the subscriber performs a hook flash to answer an incoming call as allowed by the call waiting service because the current call would be transferred in response to the hook flash as described above rather than the incoming call answered.

The conflict can be avoided by suspending the ability to perform an efficient transfer when there is an incoming call. Thus, by giving the call waiting service priority over the efficient transfer service of the present invention, the two services can be provided without conflict. In operation, when a hook flash is performed by the subscriber when there is no incoming call, the efficient transfer feature of the present invention is invoked. When there is an incoming telephone call on the other hand, the call waiting service is invoked.

The first embodiment of the present invention is limited in the sense that the hook flash begins a series of events that automatically lead to the call being transferred to the transfer number. As a result, services that require additional actions by the calling party after the hook flash, such as entering a telephone number, cannot by provided according the first embodiment of the present invention. Consequently, the first embodiment of the present invention is useful for subscribers that do not or cannot subscribe to three-way calling.

Figure 2:
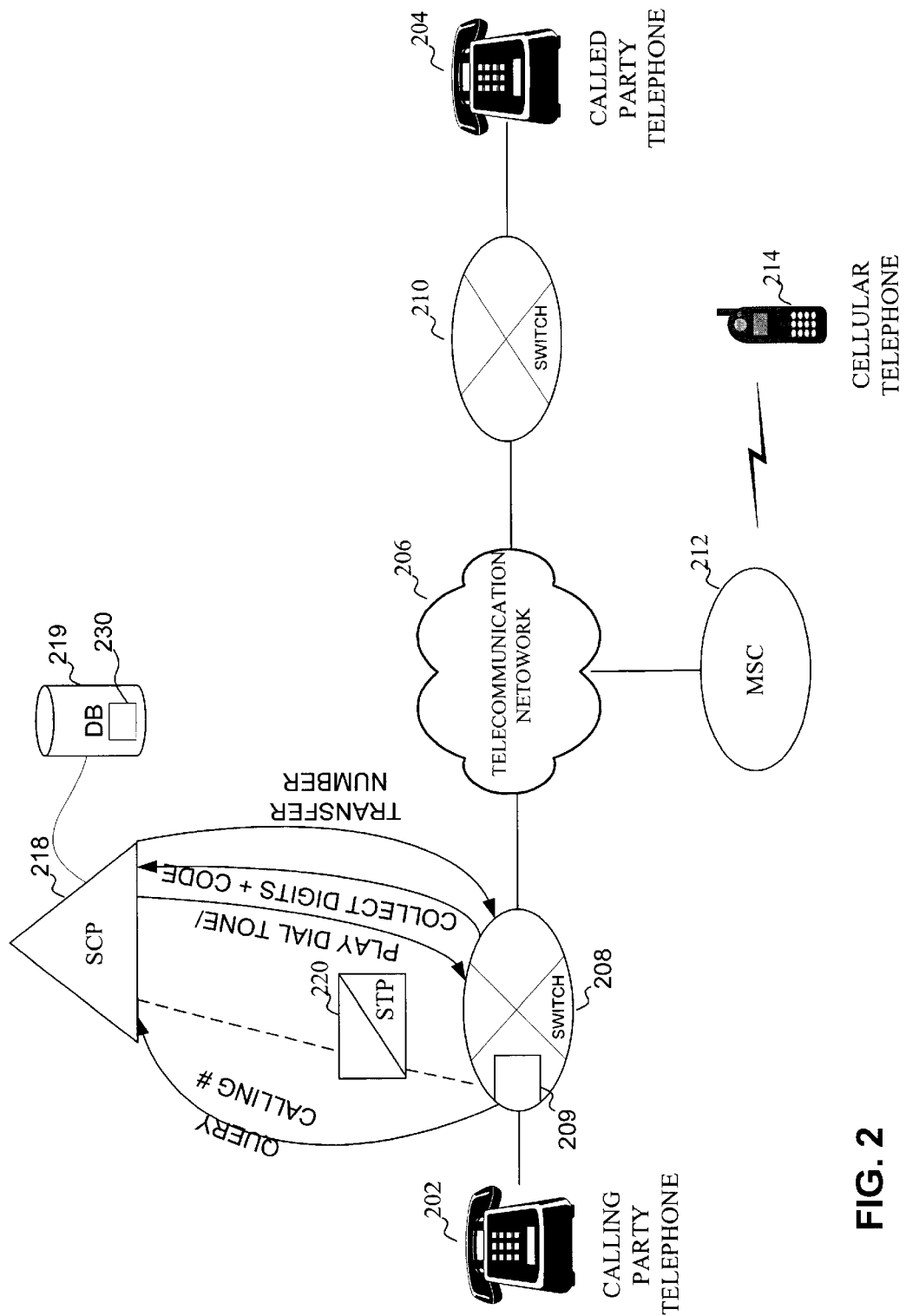
FIG. 2 is a schematic illustration of a system for performing an efficient telephone call transfer according to an embodiment of the present invention that allows a service that requires additional information to be entered after a hook flash such as three-way calling to be used along with efficient transfer of telephone calls.

FIG. 2 is a schematic diagram of a system for performing efficient transfer of telephone calls according to an embodiment of the present invention that allows invocation of services requiring additional information to be provided after the hook flash. For example, a valid telephone number must be provided to invoke three-way calling. For purposes of convenience and clarity, the ensuing description uses three-way calling to represent an the additional telephone service that requires additional information after the hook flash. Those skilled in the art would recognize that other services can be invoked in a similar manner.

A calling party uses a calling party telephone 202 to establish a telephone call to a called party using a called party telephone 204. Called party telephone 204 can be any telephone including a computer configured to emulate a telephone. The call is completed over PSTN 206 through switches 208 and 210. Typically, switches 208 and 210 are located in one or more central offices of a telephone company and are components of PSTN 206. Alternatively, one or both of switches 208 and 210 are premises devices such as a PBX. During the telephone call, the calling party decides to perform a mid-call operation such as a transfer or a three-way call.

To initiate the transfer or three-way telephone call, the calling party performs a hook flash. A mid-call trigger 209 provisioned in switch 208 on the calling party's line causes a query to determine how to process the call to be sent to an SCP 218. The query preferably comprises the calling party's number and an indication that the hook flash was performed.

Upon receiving the query, SCP 218 determines which services the calling party subscribes to. As described above, SCP 218 can make this determination by querying a database containing subscription data, such as database 219. Upon making this inquiry, for purposes of the present example, SCP 218 determines that the calling party subscribes to the call transfer service and the three-way calling service.

Having determined that the calling party subscribes to both the efficient transfer service and three-way calling, SCP 218 must determine which of the services the calling party desires. To make this determination, SCP 218 instructs switch 208 to provide a dial tone to the calling party. The dial tone serves to prompt the calling party to enter a code that signifies which service the calling party wishes to use. In one embodiment of the present invention, the code is a star code such as *97 for speed transfer or a valid telephone number corresponding to a third party the calling party wishes to add to the current telephone conversation for three-way calling. Switch 208 receives the code entered by the user and forwards it to SCP 218. SCP 218 analyses the code entered by the calling party to determine whether the calling party desired speed transfer or three-way calling.

If the calling party inputs the code for an efficient telephone call transfer, SCP 218 obtains the transfer number associated with the calling party number. To obtain the transfer telephone number, SCP 218 accesses a subscriber information table 230 stored on a database 219. Using the calling party number contained in the query from switch 208, SCP 218 retrieves the transfer telephone number from subscriber information table 230.

A subscriber table 230 that can be used by SCP 218 to assist it in making the determination about which service the calling party desires is illustrated in FIG. 2A. Subscriber table 230 preferably includes four columns for each subscriber that subscribes to the call transfer and/or three-way calling service of the present invention. The first column corresponds to the subscriber's telephone number. The second column is the transfer number that the subscriber desires calls to be transferred to when the subscriber opts to transfer a telephone call. The third column is an indication of whether transfer calling is active. The fourth column indicates whether the three-way calling service is active.

The active flags for the transfer and three-way calling services allow these services to be activated or deactivated by the telephone company and/or the subscriber. For example, the telephone company may deactivate the services temporarily for unpaid bills. The subscriber may deactivate the services to avoid service conflicts. The value of the flag entry may be used to distinguish the reason for deactivation.

In one embodiment of the present invention, a subscriber can access the portion of the subscriber information table 230 pertinent to that subscriber so that he or she can modify the transfer telephone number and/or active state of the services. For example, the access can be provided through a password-controlled web site that gives the subscriber access to the subscriber information table.

In a response to the query, SCP 218 returns the transfer telephone number to switch 208 with instruction to switch 208 to make a telephone call to the transfer telephone number. A telephone associated with the transfer number rings, and is answered. For example, the calling party can transfer the call to a cellular telephone 214 through MSC 212. When the call is answered (e.g., when the calling party answers the telephone), the calling party hangs up calling party telephone 202 to complete the transfer.

If the calling party enters a valid telephone number, SCP 218 sends the entered phone number to switch 208 with instruction to switch 208 to make a telephone call to a telephone associated with the entered telephone number. The telephone associated with the entered telephone number rings. When the telephone call is answered, the calling party performs a hook flash to complete the three-way calling.

Figure 3:
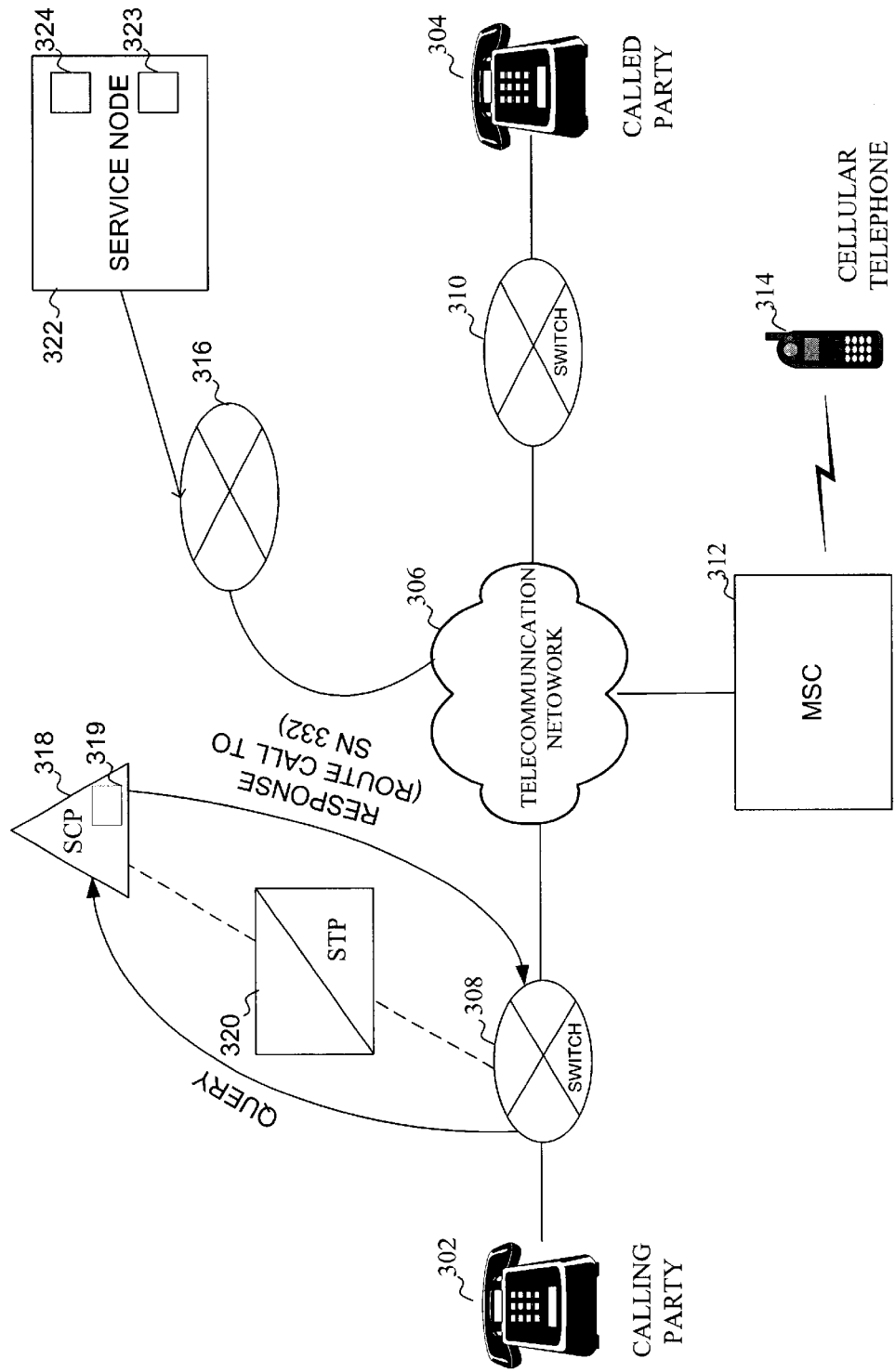
FIG. 3 is a schematic illustration of a system for performing an efficient telephone call transfer according to an embodiment of the present invention using a services node.

FIG. 3 is a schematic diagram of another embodiment of the present invention for performing efficient transfer of telephone calls while allowing services that require additional input after a hook flash, such as three-way calling. A calling party using a calling party telephone 302 establishes a telephone call with a called party using a called party telephone 304 over the public-switched telephone network (PSTN) 306. Calling party telephone 302 accesses PSTN 306 through a switch 308. Switch 308 is typically located in a central office of a telephone company and is an element of PSTN 306. Alternatively, switch 308 is located on premises such as a PBX. Called party telephone 304 accesses PSTN 306 through a switch 310. Called party telephone can be any telephone including a computer that is configured to emulate a telephone. Switch 310 is typically located in a central office of a telephone company and is an element of PSTN 306. Alternatively, switch 310 is located on premises such as a PBX. Switch 310 can be the same switch as switch 308.

A services node (SN) 322 has access to PSTN 306 through a switch 316. SN 322 provides a variety of services to elements located in PSTN 306. For example, SN 322 can hold telephone calls to acquire additional information from the parties to a telephone call, provide interactive voice response services and other services to elements of PSTN 306.

As described below, using the services node implementation of the present invention shown in FIG. 3 has the advantage of eliminating the compatibility issues described above that can result from offering services that interpret hook flashes differently, by eliminating the need to use hook flashes. However, to perform the desired mid-call service, the party requesting the service must know in advance that they will perform a mid-call service request such as a call transfer or a three-way call. For example, the requesting party might know they are about to leave when she establishes a telephone call with the called party.

For purposes of the following explanation, the calling party is the requesting party. When the calling party initially dials the called party's telephone number to establish a telephone call with the called party, the calling party first dials a code corresponding to the desired mid-call service feature they intend to use, followed by the called party's telephone number (e.g., *97 404-555-1234). Preferably, the code is a star code such as *97 for call transfer and *98 for three-way calling.

When switch 308 detects the star code it sends a query to an SCP 318 through STP 320 for instruction as to how to process the call. SCP 318 responds by instructing switch 308 to transfer the telephone call to SN 322. Preferably, SCP 318 determines which services node to use using a services node table 319 located in SCP 318 by table lookup. The area code or LATA identifier associated with the calling party number passed in the query from switch 308 to SCP 318 is used as the key or index to perform the table lookup in table 319.

FIG. 3A is an exemplary services node table 319 for mapping area codes or LATA identifier to services-node numbers. In one embodiment of the present invention, services node table 319 comprises 2 columns. The first column stores area codes or LATA identifiers. The second column stores the number of the services node that serves the area corresponding to that LATA identifier or area code.

The telephone call is routed to the services node indicated by services node table 319. In this case the call is routed to SN 322. Services node 322 accesses PSTN 306 through a switch 316. Preferably, switch 316 is located in a central office of a telephone company. Alternatively, switch 316 is located on premises such as a PBX. Switch 316 can be the same switch as switch 308 or switch 310.

SN 322 initiates a telephone call to called party telephone 304. Thus, SN 322 receives the call on one port and makes the call to the called party using another port. During the telephone call, the calling party desires to transfer the call. She presses a predetermined key that indicates she desires to perform mid-call processing on the telephone call. A tone detection circuit 323 in SN 322 detects the key that was pressed. If the key is the predetermined key corresponding to a mid-call transfer, SN 322 performs the requested transfer.

To perform a mid-call transfer, SN 322 stores a subscriber information table 324. Exemplary subscriber information tables have been described above with reference to subscription tables 130 and 230.

To obtain the transfer telephone number, SN 322 performs a table lookup in subscriber information table 324 using the calling party number as a key. For example, SN 322 may retrieve the telephone number associated with a calling party cellular phone 314 as the transfer telephone number. SN 322 places a telephone call to a telephone associated with the transfer telephone number obtained from subscriber information table 324 to cause that telephone to ring (e.g., to cellular telephone 314 through MSC 312). When the telephone associated with the transfer telephone number is answered, SN 322 transfers the established telephone call to switch 316, thereby offloading the telephone call. The calling party disconnects from the original telephone call by hanging up telephone 302 to complete the transfer.

In an alternative embodiment of the present invention using SN 322, detection of any key pressed, rather than a predetermined key, causes transfer of the telephone call. The alternative embodiment precludes the use of three-way calling because the depression of a key automatically causes transfer of the telephone call. Tone detection circuitry 323 in SN 322 detects the key press. In response to the key press, SN 322 obtains the transfer telephone number as described above and places a telephone call to the transfer telephone number.

To obtain the transfer telephone number, services node 302 performs a table lookup in subscription table 324 using the calling party number as a key. SN 322 places a call to a telephone associated with the obtained transfer telephone number. For example, the transfer telephone number can be associated with a cellular telephone 314. Thus, SN 322 places the telephone call to cellular telephone 314 through an MSC 312.

When the telephone call is answered, the calling party disconnects from the original telephone call to complete the transfer. At this point, SN 322 is still in the call loop. Consequently, when the call is established with the telephone associated with transfer telephone number, SN 322 transfers the telephone call to switch 316, to offload the transferred call and discontinue its involvement in processing the telephone call.

In an alternate embodiment of the present invention using a services node to help transfer the telephone call, every telephone call having a star code is sent to SN 322 for processing. Although sending such calls to a services node is technically feasible, at present it is probably not cost-efficient due to the cost of services nodes. To handle the large number of calls that would be expected, many services nodes would be required. Numerous services nodes which would render the service cost-prohibitive. However, if the cost of provisioning services nodes is reduced, then sending each call to a services node for processing would be feasible. In that case, it would also be possible to eliminate the requirement that the calling party dial a code prior to dialing the called party's telephone number to indicate that mid-call processing will occur.

Figure 4:
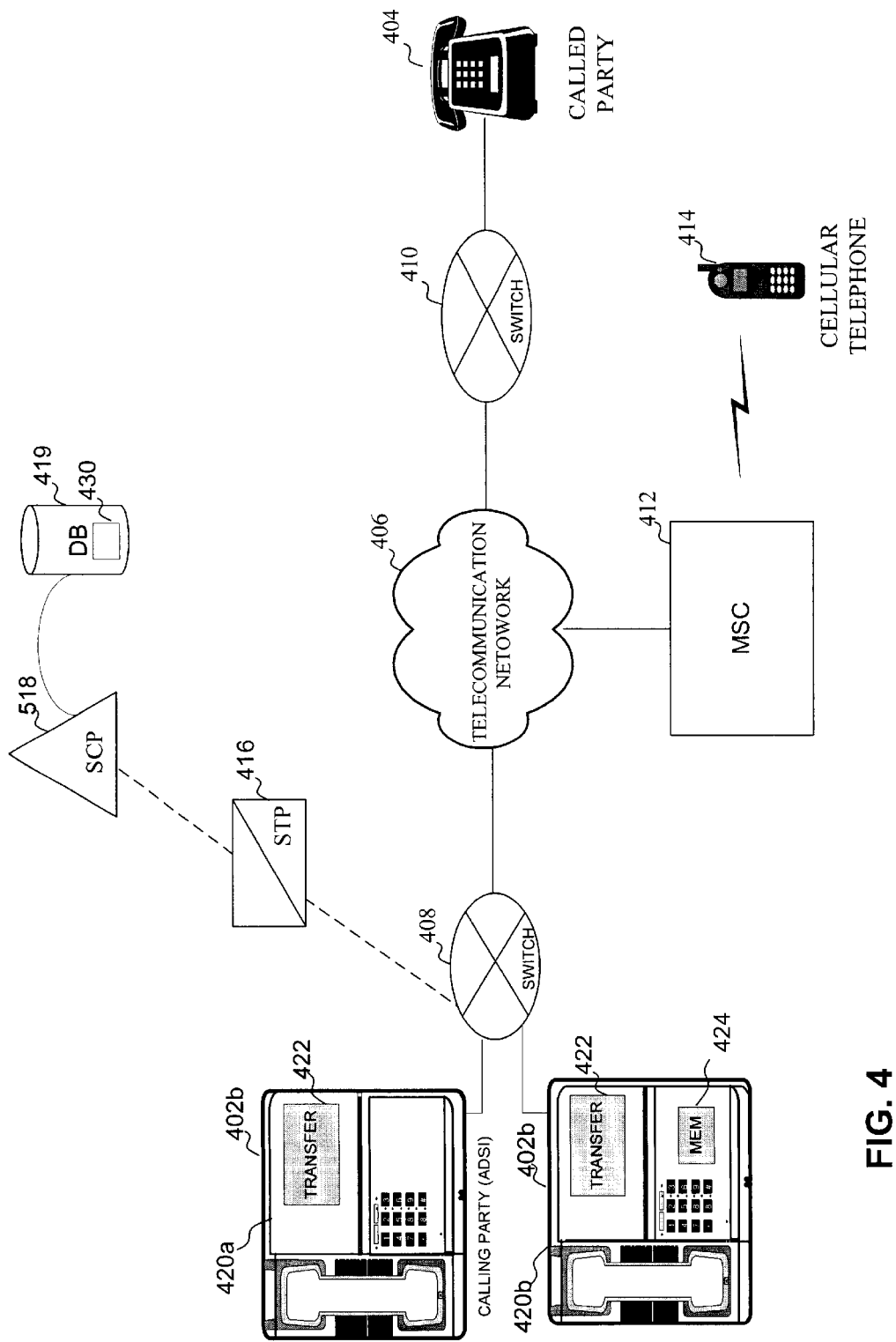
FIG. 4 is schematic illustration of a system for performing an efficient telephone call transfer using ADSI telephones according to an embodiment of the present invention.

FIG. 4 is a schematic diagram of a system for performing efficient transfer of telephone calls using an analog display services interface (ADSI) telephone 402a or 402b. ADSI telephones include screens that are programmed to provide specific features. ADSI telephone 402a has a screen 420a. ADSI telephone 402b has a screen 420b. Screens 402a and 402b comprise one or more soft buttons, i.e., buttons that can be selected. Soft buttons are graphical representations of buttons displayed in display screen 420a and 420b. Selection is typically accomplished by touching the desired soft button. As shown in FIG. 4, screen display 420a includes a fast transfer soft button 422. Screen 420b includes a fast transfer soft button 422 and a memory 424.

A calling party uses one of ADSI telephones 420a or 420b to establish a telephone call with a called party using a telephone 404, over PSTN 406. Telephone 404 can be any kind of telephone capable of being used by the called party to establish the telephone call. ADSI telephones 402a and 402b access PSTN 406 through a switch 408. Typically, switch 408 is located in a central office of a telephone company and is an element-of PSTN 406. Alternatively, switch 408 is located on premises such as a PBX. Called party telephone 404 accesses PSTN 406. through a switch 410. Called party telephone can be any telephone including a computer configured to emulate a telephone. Typically, switch 410 is located in a central office of a telephone company and is part of PST 406. Alternatively, switch 406 is located on premises such as a PBX.

During the telephone call, the calling party desires to transfer the telephone call. To transfer the telephone call using ADSI telephone 402a, the calling party selects transfer soft button 422. ADSI-capable telephone 402a converts the selection into a hook flash and code that it sends to switch 408. For example, the code can be a star code such as *97. Switch 408 receives the hook flash and code. Switch 408 sends a query to an SCP 418 through an STP 416 for instruction as to how to process the mid-call hook flash. Preferably, the query includes the calling party number, the code and an indication that the calling party performed a hook flash.

From the code transmitted in the query, SCP 418 determines that the calling party desires to perform mid-call transfer of the telephone call. Consequently, SCP 418 accesses a subscriber information table 430 stored in a database 419 to obtain a transfer telephone number associated with the calling party number. Using the calling party number sent in the query as an index to subscriber information table 430, SCP 418 retrieves the transfer telephone number corresponding to the calling party number from subscriber information table 430. Exemplary subscriber tables are described above with respect to subscriber information tables 130 and 230.

SCP 418 sends the transfer telephone number to switch 408 along with instructions to switch 408 to make a telephone call to the transfer telephone number to cause a telephone associated with the transfer telephone number to ring. For example, SCP 418 may instruct switch 408 to place a telephone call to a cellular telephone 414 through an MSC 412. When the telephone associated with the transfer number is answered the calling party hangs up ADSI telephone 402a to complete the transfer of the telephone call.

In an alternative embodiment of the present invention using an ADSI telephone, an ADSI telephone 402b is used. ADSI telephone 402b has a transfer soft button 422 as described above. In addition, ADSI telephone 402b includes a memory 424 for a storing transfer telephone number. A user of ADSI telephone 402b can enter the transfer telephone number into memory 424.

When the calling party desires to transfer a telephone call, the calling party selects transfer soft button 422 to request the transfer. ADSI telephone 402b performs a hook flash to suspend the current telephone call. Then, ADSI telephone 402b automatically dials the transfer telephone number stored in memory 424 to cause a telephone associated with the transfer telephone number to ring. When the telephone associated with the transfer telephone number is answered, the calling party hangs up ADSI telephone 402b to complete the transfer of the telephone call.

The technique for performing a fast transfer using ADSI telephone 402b does not use the telephone network of PSTN 406 to perform the efficient transfer. That is, the implementation of the present invention using ADSI telephone 402b does not rely on messaging of the AIN to transfer the telephone call. Rather, it requires only reprogramming an ADSI telephone to store a transfer telephone number, and then automatically dialing the stored transfer number when a user of the ADSI telephone touches transfer soft button 422.

ADSI telephones 402a and 402b provide two implementations of soft button configurations that can be used according to embodiments of the present invention. It would be apparent to those skilled in the art that other soft button configurations can be implemented that would provide an efficient transfer functionality within the scope and spirit of the present invention.

Figure 5:
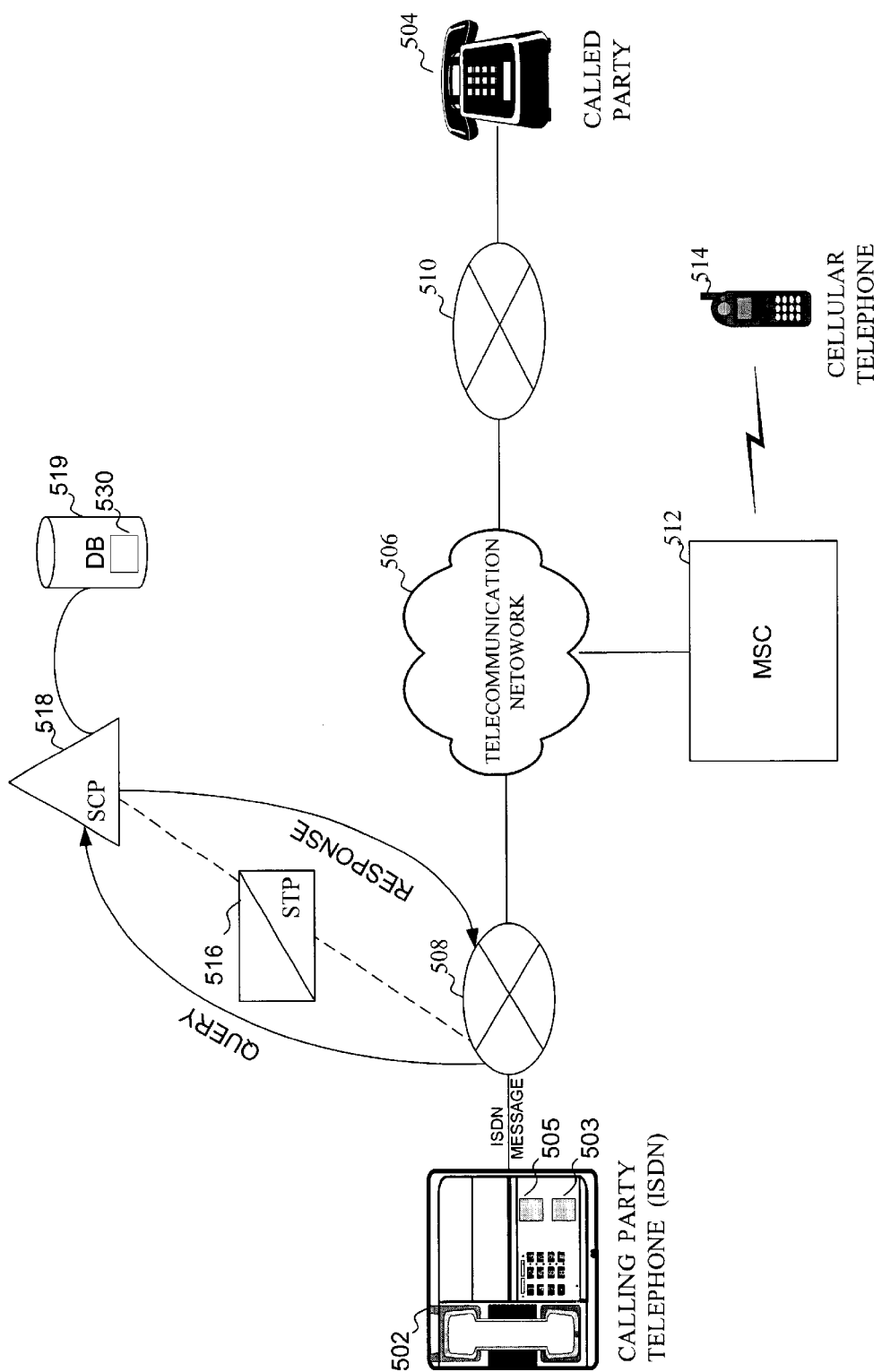
FIG. 5 is a schematic illustration of a system for performing an efficient telephone call transfer using an ISDN telephone according to an embodiment of the present invention.

FIG. 5 is a schematic diagram of a system for transferring telephone calls using an ISDN telephone according to an embodiment of the present invention. A calling party using an ISDN telephone 502 establishes a telephone call with a called party using a called party telephone 504. ISDN telephone 502 accesses PSTN 506 through a switch 508. Typically, switch 508 is located in a central office of a telephone company and is an element of PSTN 506. Alternatively, switch 508 is located on premises such as a PBX. Called party telephone 504 accesses PSTN 806 through a switch 510. Called party telephone 504 can be any telephone including a computer configured to emulate a telephone. Typically, switch 510 is located in a central office of a telephone company and is an element of PSTN 506. Alternatively, switch 510 is located on premises such as a PBX.

During the telephone call, the calling party desires to transfer the telephone call to another telephone, for example, a cellular telephone 514. ISDN telephone 502 has a feature button 503. Feature button 503 can be used to invoke a call control feature such as call transfer. According to a first embodiment of the present invention using an ISDN telephone to initiate the transfer of a telephone call, the calling party presses feature button 503. When feature button 503 is pressed, ISDN telephone 502 sends a message to switch 508 indicating that mid-call processing is required.

When switch 508 receives the message, it formulates a query to an SCP 518 through an STP 516. The query includes an identification of which feature button was pushed (in this case feature button 503) as well as the calling party number. Using the identification of the feature button that was pressed, SCP 518 determines that by pressing feature button 503, the calling party requested a mid-call transfer.

Using the calling party number, SCP 518 performs a table lookup in a subscriber information table 530 stored in a database 519. Subscriber information tables have been described above with respect to subscriber tables 130 and 230. SCP 518 retrieves the transfer number from subscriber information table 530 and returns the transfer telephone number to switch 508 in response to the query with instructions that switch 508 make a telephone call to a telephone associated with the transfer telephone number.

Switch 508 makes the telephone call to the transfer telephone number to cause that telephone to ring. When this telephone call is answered, the calling party hangs up ISDN telephone 502 to effectuate the transfer.

In another embodiment of the present invention, a user presses a transfer button 505 to transfer the telephone call. Transfer button 505 is one of four buttons specially defined by the ISDN standard. The four buttons so specially defined are hold, conference, drop and transfer. These buttons are specially defined due to their frequent use. As a result of these definitions, special messages are sent by ISDN phone 502 to switch 508 when one of the four buttons is pressed. Thus, in the present case, when the calling party presses transfer button 505, switch 508 presents a dial tone to the calling party. In response to the dial tone, the user can enter a code, such as a star code, to perform the efficient transfer of the present invention.

Switch 508 receives the code. In response to the code, switch 508 sends a query to SCP 518 through STP 516. The query includes the calling party number.

Using the calling party number, SCP 518 performs a table look up in a subscriber information table 530. SCP 518 retrieves a transfer telephone number corresponding to the calling party number, and returns it to switch 508 with instructions to switch 508 to complete a telephone call to a telephone associated with the transfer telephone number.

Switch 508 causes a telephone associated with the transfer telephone number to ring. For example, the transfer telephone number can correspond to a cellular telephone 514. When the telephone call is answered, the calling party hangs up the ISDN phone 502 to effectuate the transfer.

In a third embodiment of the present invention using an ISDN telephone to initiate transfer of a telephone call, an efficient transfer is performed as well as three-way calling. As described above, when transfer button 505 is pressed, the calling party is presented with a dial tone. In response to the dial tone, the user can enter a code, such as a star code, to perform the efficient transfer. Alternatively, in response to the dial tone, the calling party can enter a valid telephone number. Switch 508 receives the digits entered by the calling party.

If the user dialed a code, indicating that the calling party desires to transfer the telephone call, switch 508 sends a query to SCP 518 through STP 516. The query includes the calling party number. Using the calling party number, SCP 518 performs a table look up in a subscriber information table 530. SCP 518 retrieves a transfer telephone number corresponding to the calling party number, and returns it to switch 508 with instruction to switch 508 to complete a telephone call to the transfer telephone number. By placing the telephone call to the transfer telephone number, switch 508 causes a telephone associated with the transfer number to ring. For example, the telephone number can correspond to a cellular telephone 514. When the telephone call is answered, the calling party hangs up the ISDN phone 502 to effectuate the transfer.

If the calling party enters a valid telephone number, indicating that the calling party desires to add a third party to the telephone call to form a three-way call, switch 508 sends a query to SCP 518 through STP 516. The query includes the calling party number and the entered valid telephone number. SCP 518 instructs switch 508 to complete a telephone call to the entered valid telephone number. Switch 508 causes a telephone associated with the entered valid telephone number to ring. When the telephone call is answered, the three-way telephone call is completed.

A fourth embodiment for transferring a telephone call using ISDN telephone 502 uses an implicit transfer. In this case, when the calling party desires to transfer the telephone call, the calling party presses transfer button 505. As described above, a dial tone is provided to the calling party. Rather than enter a code as required above, the calling party presses transfer button 505 again or hangs up. Pressing transfer button 505 or disconnecting from the telephone call signals switch 508 to transfer the telephone call to a transfer telephone number. At this point, switch 508 determines the transfer number associated with the calling party's telephone. As described above, one way switch 508 can make this determination is by querying SCP 518. In response to the query, SCP 518 performs a table look up in a subscriber information table 530 stored in database 519. SCP 518 returns the transfer telephone number to switch 508 along with an instruction to make a telephone call to the transfer telephone number to cause a telephone associated with the transfer telephone number to ring. The call transfer is completed when the telephone associated with the transfer telephone number is answered.

Figure 6:
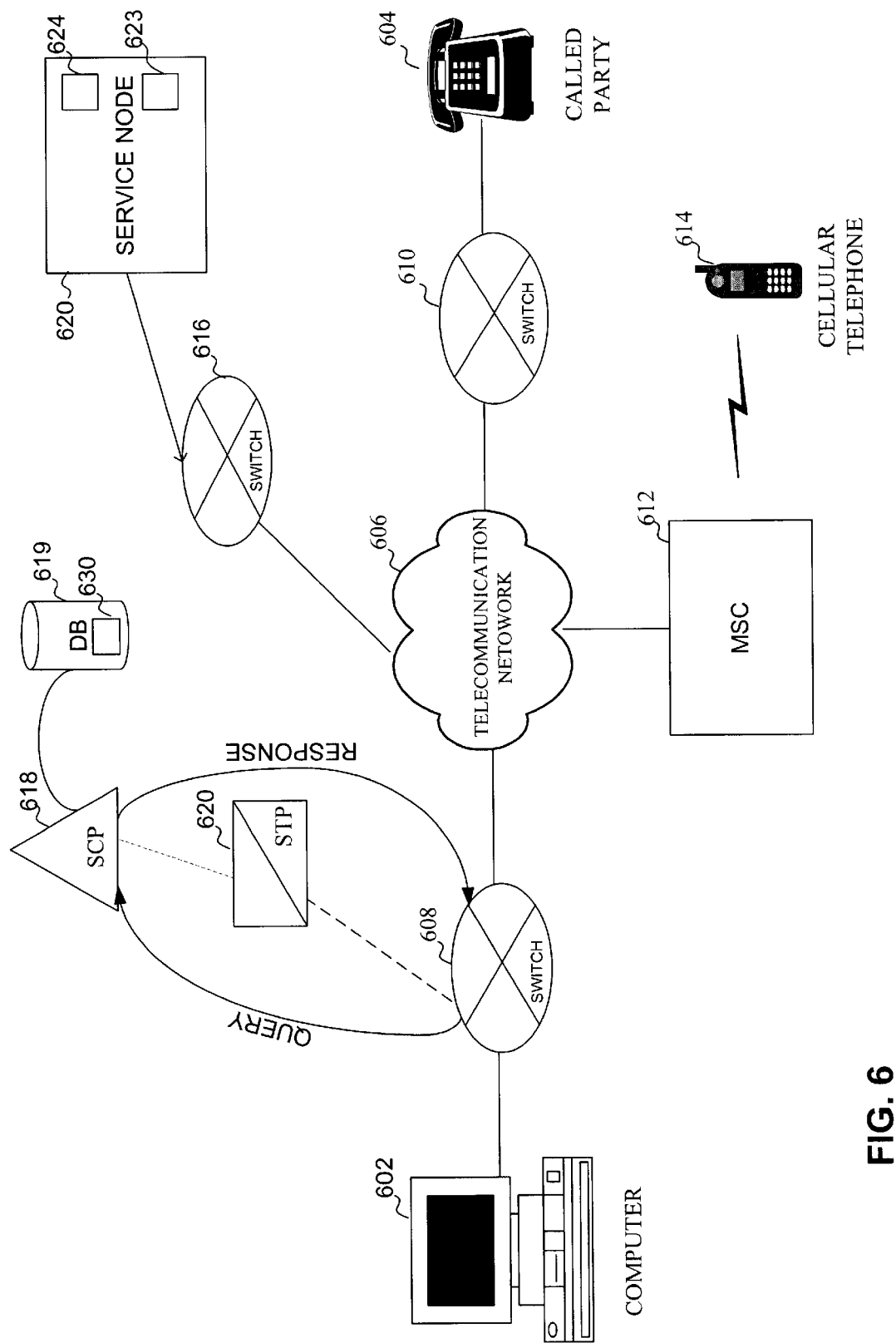
FIG. 6 is a schematic illustration of a system for performing an efficient telephone call transfer using a computer that emulates a telephone according to an embodiment of the present invention.

FIG. 6 is a schematic diagram of a system according to an embodiment of the present invention for transferring a telephone call using a computer 602 configured to emulate a telephone. Computer 602 can place a telephone call to a called party using a telephone 604 over PSTN 606. Computer 602 can be any computer that is configured to emulate a telephone and perform the functions described herein. For example, computer 602 can be configured with a modem and modem driver software and/or a telephone interface card with appropriate driver software or other means of emulating a telephone to enable communication with a telephone switch 608.

Switch 608 is typically located in a central office of a telephone company and is an element of PSTN 606. Alternatively, switch 608 is located on premises such as a PBX. Called party telephone 604 communicates with PSTN 604 through a switch 610. Called party telephone 604 can be any telephone including a computer configured to emulate a telephone. Switch 610 is typically located in central office of a telephone company and is an element of PSTN 606. Alternatively, switch 610 is located on premises such as a PBX.

Using computer 602, the calling party completes a telephone call to a called party using called party telephone 604 over PSTN 606. When the calling party desires to transfer the telephone call, for example, to a cellular telephone 614 through an MSC 612, the calling party preferably selects a transfer action from a display shown in a screen of computer 602. For example, a telephone interface can be displayed to the calling party on the screen in a graphical user interface (GUI). A portion of the GUI can be a box that a user selects to perform the transfer.

As is well-known to those skilled in the art, computer 602 can be configured to emulate any type of telephone including analog, ADSI and ISDN telephones. Consequently, the transfer service of the present invention can be implemented where a computer 602 emulates a telephone. For example, if computer 602 emulates an analog telephone, efficient transfer of telephone calls proceeds as described above with respect to FIGS. 1, 1A, 2, 2A, 3 and 3A and accompany text, where the calling party uses an analog telephone. Similarly, if computer 602 emulates an ADSI telephone, efficient transfer of telephone calls proceeds as described above with respect to FIG. 4 and accompanying text, where the calling party uses an ADSI telephone. Similarly, if computer 602 emulates an ISDN telephone, efficient transfer of telephone calls proceeds as described above with respect to FIG. 5 and accompanying text, where the calling party uses an ISDN telephone.

The system sends messages through STP 620 to SCP 618, which can access a subscriber information table 630 in database 619 to accomplish telephone transfer or services, such as three-way calling as described above for accessing these elements of the telephone network. Similarly, where a computer 602 emulates a telephone, the system can make use of a services node 620 having tone detection circuit 623 and subscriber information table 624 as described above.

Figure 7:
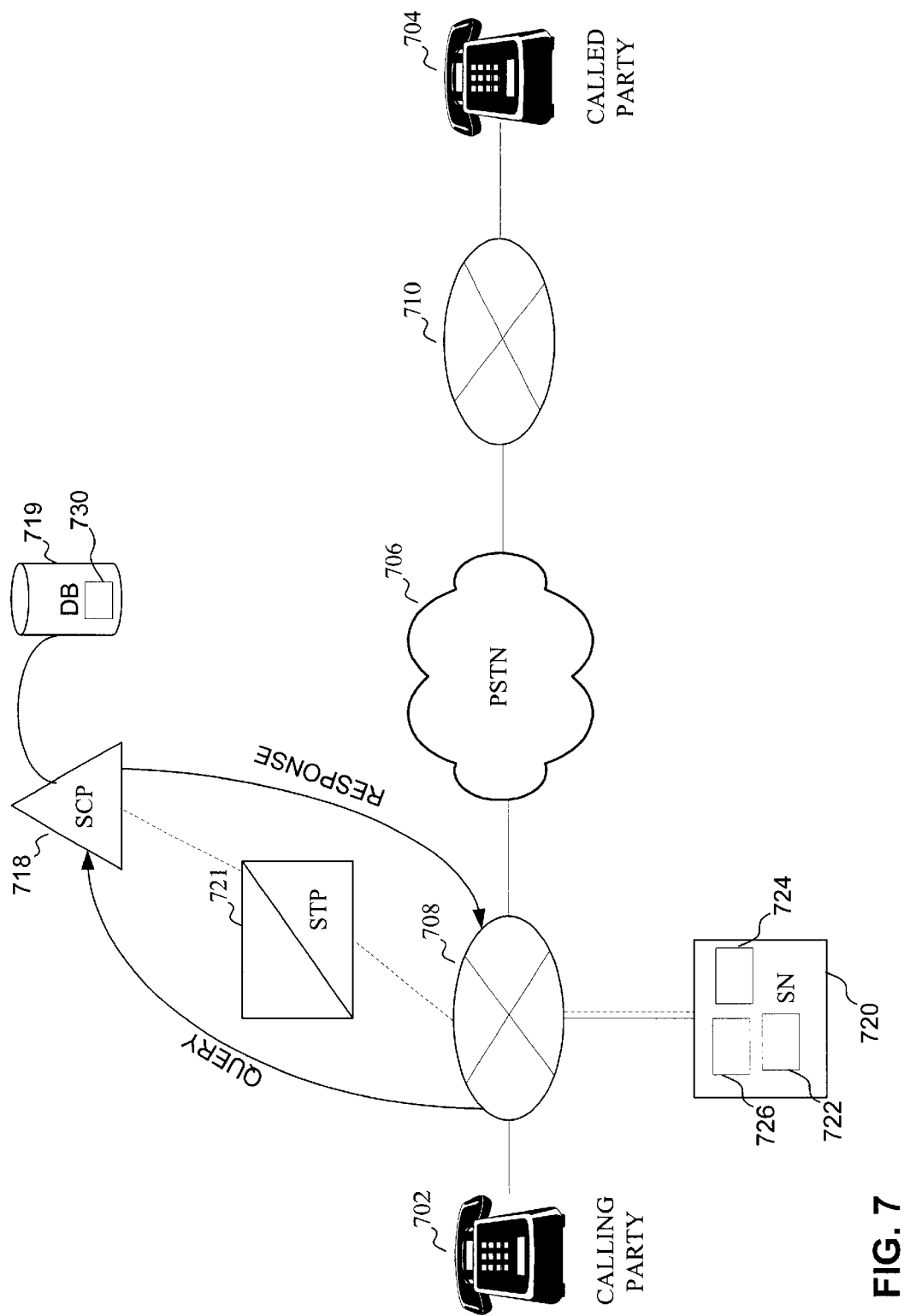
FIG. 7 is a schematic illustration of a system for performing an efficient telephone call transfer using a services node to allow selection of a telephone transfer number according to an embodiment of the present invention.

Another embodiment of the present invention allows the party transferring the telephone call to select from a number of transfer destinations. That is, rather than using a fixed transfer location as described above, the transferring party can select the transfer number from a pre-determined list of transfer numbers. FIG. 7 is a schematic diagram of an embodiment of the present invention that provides a transfer telephone service, while allowing the transferring party to select the transfer destination telephone number from a plurality of telephone numbers.

A calling party using a calling party telephone 702 establishes a telephone call to a called party using a called party telephone 704 over a PSTN 706. Calling party telephone 702 accesses PSTN 706 through a switch 708. Calling party telephone 702 can be any kind of telephone including a computer configured to emulate a telephone. Preferably, switch 708 is located in a central office of a telephone company and is an element of PSTN 706. Alternatively, switch 708 is located on premises such as a PBX. Called party telephone 704 accesses PSTN 706 through a switch 710. Called party telephone 704 can be any kind of telephone, including a computer configured to emulate a telephone. Preferably, switch 710 is located in a central office of a telephone company and is an element of PSTN 706. Alternatively, switch 710 is located on premises such as a PBX.

During the telephone call, the calling party decides to transfer the telephone call. To initiate the transfer, the calling party performs an action as described above. For example, the calling party can perform a hook flash, dial a code or perform some other action to initiate transfer of the telephone call. Switch 708 detects the action.

In response to the action, switch 708 passes the telephone call to a media server, intelligent peripheral (IP), or services node (SN) 720. SN 720 preferably conducts an interactive voice response session with the calling party to obtain the desired destination of the telephone call.

Alternatively, the SN plays an announcement asking the user to press a particular key for a particular transfer number. For example, the announcement may be Dial 1 for mom. "Dial 2 for Bob. Dial 3 for Sue."

After obtaining the selected digit, SN 720 returns the telephone call back to switch 708. Switch 708 then sends the selected digit to an SCP 718 through an STP 720 to complete the processing of the telephone call. The returned message includes the calling party number, an indication that a transfer is requested and the selected digit. To determine the transfer telephone number, SCP 718 accesses a subscriber information table 730 stored in a database 719. Preferably, the transfer telephone number is determined by using the calling party number and selected digit to index subscriber information table 730 to obtain the transfer telephone number corresponding to the calling party number and selected digit.

SCP 718 returns the transfer telephone number obtained from subscriber information table 730 to switch 708 through STP 720 in response through to the query along with an instruction for switch 708 to make a call to the transfer telephone number. Making the telephone call causes a telephone associated with the transfer telephone number to ring. When that telephone is answered, the calling party disconnects from the telephone call to complete the transfer.

Alternatively, the SN could be provisioned with the call transfer service logic and subscription information. In this configuration, the switch would route the call to the SN based on the feature code. The SN would process the call without requiring SCP participation.

Figure 8:
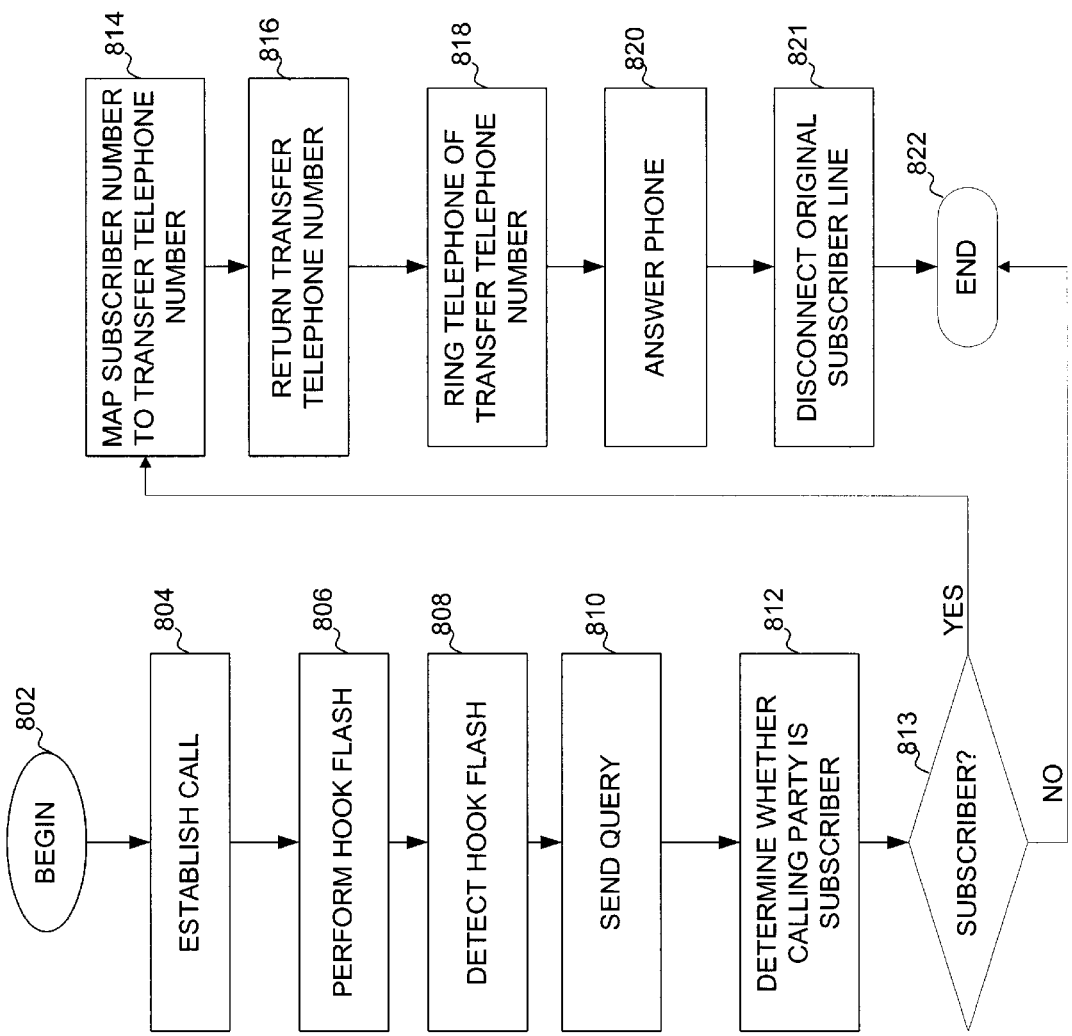
FIG. 8 is an exemplary flow chart illustrating a method for performing an efficient telephone call transfer according to an embodiment of the present invention.

In another embodiment, the present invention is a method for performing a telephone call transfer. A method transferring a telephone call according to an embodiment of the present invention is illustrated by the flow chart of FIG. 8. The method begins in step 802. In step 804, a calling party establishes a telephone call to a called party. After the telephone call is established, the calling party decides to transfer the telephone call to another telephone. For example, the calling party may want to transfer the telephone call to her cellular telephone because she wants to leave the house. In step 806, the calling party performs a hook flash to initiate transfer of the telephone call. The hook flash is detected in step 808. Preferably, a mid-call trigger provisioned on the calling party's line detects the hook flash. Use of the midcall trigger to detect a hook flash is well known to those having skill in the art.

When the mid-call trigger is detected, a query is sent to obtain a transfer telephone number in step 810. The query preferably includes the calling party number and an indication that the hook flash was performed. Preferably, the query is sent using the AIN network. The query requests instructions for processing the telephone call in response to the hook flash. In steps 812 and 813 it is determined whether the calling party is a subscriber of the transfer service. In one embodiment of the present invention, this determination is made by querying a database (described above). If the calling party is not a subscriber, the method ends in step 822.

If the calling party is a subscriber then the calling party number (i.e., the subscriber number) is mapped to a transfer telephone number in step 814. In an embodiment of the present invention, the mapping is performed as follows. Using the calling party number as an index (or key), a table lookup in a subscriber transfer number table is performed to retrieve a transfer telephone number associated with the calling party number. In step 816, the transfer telephone number is returned over the AIN network in response to the query.

In step 818, the telephone corresponding to the transfer telephone number is rung. In step 820, the ringing telephone is answered. In step 821, the original subscriber line is disconnected to complete transfer of the telephone call. The method ends in step 822.

FIG. 9 illustrates another embodiment a method for transferring a telephone call according to the present invention. The method illustrated in FIG. 9 allows services that require additional information after a hook flash, such as three-way calling, to be offered to subscribers along with the efficient transfer service. The method begins in step 902. In step 904, a calling party places a telephone call to a called party. During the telephone call, the calling party decides to transfer the call or join a third party into the telephone call to form a three-way telephone call. To access the transfer or three-way calling feature, the calling party performs a hook flash in step 906. The hook flash indicates that the calling party desires to perform mid-call service such as a telephone call transfer or a three-way call.

In response to the hook flash, a query is sent to determine how to process the mid-call service request in step 908. In step 910, a dial tone is played to the calling party to prompt the calling party to enter digits and/or a star code to indicate whether the calling party desires to perform a transfer or a three-way call. In step 912, the digits entered by the calling party in response to the dial tone are collected. In step 914, a determination is made based on the collected digits as to whether an efficient transfer or a three-way call is desired.

If the party desires to transfer the telephone call, the method continues in step 916 where the subscriber number is used to determine a transfer telephone number. Preferably, this is accomplished by mapping the calling party number to the appropriate transfer telephone number in a subscriber information table. In step 918, the transfer telephone number is returned in response to the query. In step 920, the telephone associated with the transfer telephone number is rung. In step 922, the ringing telephone is answered. In step 924, the original subscriber line is disconnected to complete transfer of the telephone call. The method ends in step 925.

If a three-way call was requested by entry of a valid telephone number in response to the dial tone in step 912, the method continues in step 926 where the entered valid telephone number is returned in response to the query. In step 928, the telephone associated with the returned valid telephone number is caused to ring. In step 930, the ringing telephone is answered. In step 932, a hook flash is performed to complete the three-way call. The method ends in step 925.

The foregoing description was cast in terms of the calling party performing the transfer of the telephone call. The present invention can also be used when the called party is the party that transfers the call. In that case, the switch to which the called party phone is connected would perform the functions described above with respect to the switch to which the calling party phone was connected and the transfer would proceed as described above.

In addition to the landline calling and called party contexts, the present invention can also be used when the subscriber wishes to transfer a call from a wireless telephone to a landline telephone. Such a configuration would be implemented using the mobile switching center (MSC) triggers in the wireless network, and similar intelligent network capabilities located in the wireless or landline network.

The foregoing description was also cast in the context of the PSTN and the Advanced Intelligent Network. It is apparent to one skilled in the art that similar functions could be implemented in an Internet Protocol (IP) packet voice network, such as one implemented using soft switches, application servers, media servers and appropriately-distributed service logic.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for transferring a telephone call, comprising the steps of:
   (a) establishing a telephone call between a calling party and a called party;
   (b) detecting an action indicating that a transfer of the telephone call is desired;
   (c) sending a query to determine how to process the telephone call in response to the action,
   (d) using information sent in the query to determine a transfer telephone number to which the telephone call is to be transferred;
   (e) returning the transfer telephone number in response to the query;
   (f) causing a telephone associated with the transfer telephone number to ring; and
   (g) disconnecting a party performing the action in step (b) from the telephone call to complete transfer of the telephone call.

2. The method of claim 1, wherein the action is in step (b) is a hook flash, further comprising the step of sending an indication that the hook flash was performed in the query.

3. The method of claim 1, further comprising the step of pre-storing the transfer telephone number in a subscriber information table.

4. The method of claim 1, further comprising the steps of:
   determining whether a transfer service is active; and
   transferring the telephone call only if the transfer service is determined to be active.

5. The method of claim 1, wherein the action in step (b) is a hook flash, further comprising the steps of:
   determining whether the party performing the hook flash subscribes to a call waiting service; and
   suspending transfer of the first telephone call when there is an incoming telephone call if the party performing the hook flash subscribes to the call waiting service.

6. The method of claim 1, further comprising the steps of:
   prompting the party performing the action to select a transfer tag; and
   determining a transfer telephone number in response to the party's selection.

7. The method of claim 6, further comprising the step of speaking the transfer tag in response to the prompting step.

8. The method of claim 6, further comprising the step of pressing a key on a telephone keypad in response to the prompting step.

9. The method recited in claim 1, further comprising the step of sending the query to a network element containing service logic in a telecommunication network in a public-switched telephone network.

10. A method for transferring a telephone call, comprising the steps of:
    (a) establishing a telephone call between a calling party and a called party;
    (b) detecting an action performed by a party to the telephone call indicating that the party desires to perform mid-call telephone call service;
    (c) prompting the party performing the action for a selection of the service requested;
    (d) transferring the telephone call if the party performing the action enters a code associated with a transfer service; and
    (e) performing another telephone call processing service in accordance with the entered code if the calling party does not enter the code associated with a transfer service.

11. The method recited in claim 10, wherein the party performing the action enters a code corresponding to the transfer service, further comprising the steps of:
    (f) sending a query to obtain a transfer telephone number;
    (g) using information sent in the query to determine a transfer telephone number to which the telephone call is to be transferred;
    (h) returning the transfer telephone number in response to the query;
    (i) causing a telephone associated with the transfer telephone number to ring; and (j) disconnecting the party performing the action from the first telephone call to complete the transfer of the first telephone call.

12. The method of claim 11, further comprising the step of pre-storing the transfer telephone number in a subscriber information table.

13. The method of claim 11, further comprising the steps of:
performing a table lookup to determine whether a transfer service is active; and
transferring the first telephone call only if the transfer service is active.

14. The method of claim 11, further comprising the steps of:
prompting the party performing the action to select a transfer tag; and
determining a transfer telephone number in response to the party's selection.

15. The method of claim 14, further comprising the step of speaking the transfer tag in response to the prompting.

16. The method of claim 14, further comprising the step of pressing a key on a telephone keypad in response to the prompting.

17. The method recited in claim 11, further comprising the step of obtaining the transfer telephone number from a media server in a telecommunication network.

18. The method recited in claim 10, wherein the another telephone call processing service in step (e) is establishing a three-way telephone call, further comprising the steps of:
(f) receiving a valid telephone number in response to the prompting;
(g) making a telephone call to a telephone associated with the valid telephone number to cause the telephone to ring;
(h) answering the telephone associated with the valid telephone number; and
(i) performing a hook flash complete the three-way telephone call.

19. A system for performing an efficient transfer of a telephone call, comprising:
a first switch that couples a calling party telephone to a PSTN;
a second switch that couples a called party telephone to a PSTN, wherein a telephone call can be established from the calling party to the called party over the PSTN through the first switch and the second switch;
a network element containing service logic coupled to one of the first and second switches;
a database coupled to the network element, wherein the database comprises a subscriber information table comprising a first column and a second column, wherein the first column is used to store a subscriber identification and the second column is used to store a transfer telephone number associated with the subscriber identification, wherein the network element is adapted to receive a query for a transfer telephone number from a one of the first and second switches and determine a transfer telephone number to return to the one of the first and second switches in response to the query.

20. The system of claim 19, further comprising a telephone call established between the calling party and the called party through the first and second switches and wherein the one of the first and second switches to which the network element is coupled comprises means for detecting an indication that one of the calling party and the called party desires to perform a midcall transfer of the telephone call.

21. The system of claim 19, wherein the transfer telephone number associated with a particular subscriber identification is obtained from a subscriber associated with the subscriber identification.

22. The system of claim 19, wherein the subscriber identification is a telephone number associated with a subscriber identified by the subscriber identification.

23. The system recited in claim 19, wherein the one of the first and second switches is adapted to suspend transfer of the telephone call when a request to transfer the telephone call would be incompatible with another telephone call handling service.

24. The system recited in claim 19, where at least one of the called party telephone and the calling party telephone is an ISDN telephone.

25. The system recited in claim 19, where at least one of the called party telephone and the calling party telephone is an ADSI telephone.

26. The system recited in claim 19, where at least one of the called party telephone and the calling party telephone is an analog telephone.

27. The system recited in claim 19, where at least one of the called party telephone and the calling party telephone is computer configured to emulate a telephone.

28. A system for performing an efficient transfer of a telephone call, comprising:
a first switch that couples a calling party telephone to a PSTN;
a second switch that couples a called party telephone to a PSTN, wherein a telephone call can be established from the calling party to the called party over the PSTN through the first switch and the second switch;
a services node coupled to the PSTN comprising a subscriber information table, that comprises two columns, wherein a first column is used to store a subscriber identification and a second column is used to store a transfer telephone number associated with the subscriber identification stored in the first column, wherein the services node is adapted to prompt a one of the calling party and the called party that requests a midcall transfer to enter a code to request transfer of the telephone call, and wherein the services node is adapted to obtain a transfer telephone number to which the telephone call should be transferred and wherein the services node is further adapted to cause a telephone associated with the telephone transfer number to ring.

29. The system of claim 28, wherein the transfer telephone number associated with a particular subscriber identification is obtained from a subscriber associated with the subscriber identification.

30. The system of claim 28, wherein the subscriber identification is a telephone number associated with a subscriber identified by the subscriber identification.

31. The system of claim 28, wherein the services node is adapted to receive one of a code indicating that it should transfer the telephone call and a valid telephone number indicating it should establish a three-way telephone call.

32. The system recited in claim 28, wherein the services node is further adapted to transfer the telephone call to a switch when the telephone associated with the transfer telephone number is answered.

33. A system for performing an efficient transfer of a telephone call, comprising:
a first switch that couples a calling party telephone to a PSTN;
a second switch that couples a called party telephone to a PSTN, wherein a telephone call can be established from the calling party to the called party over the PSTN through the first switch and the second switch;

a services node coupled to the PSTN comprising a subscriber information table, that includes subscriber information, and a transfer telephone number associated with each subscriber identification so stored, wherein the services node is adapted to prompt a one of the calling party and the called party that requests a mid-call transfer to enter a code to request transfer of the telephone call, and wherein the services node is adapted to obtain a transfer telephone number to which the telephone call should be transferred and wherein the services node is further adapted to cause a telephone associated with the telephone transfer number to ring.

34. The system of claim 33, wherein the transfer telephone number associated with a particular subscriber identification is obtained from a subscriber associated with the subscriber identification.

35. The system of claim 33, wherein the subscriber identification is a telephone number associated with a subscriber identified by the subscriber identification.

36. The system of claim 33, wherein the services node is adapted to receive one of a code indicating that it should transfer the telephone call and a valid telephone number indicating it should establish a three-way telephone call.

37. The system recited in claim 33, wherein the services node is further adapted to transfer the telephone call to a switch when the telephone associated with the transfer telephone number is answered.

* * * * *

UNITED STATES PATENT AND TRADEMARK OFFICE
CERTIFICATE OF CORRECTION

PATENT NO. : 6,853,718 B1
DATED : February 8, 2005
INVENTOR(S) : Bedingfield, Sr. et al.

It is certified that error appears in the above-identified patent and that said Letters Patent is hereby corrected as shown below:

Column 2,
Line 21, should read:

A significant drawback associated with conventional mechanisms for transferring telephone calls is that numerous digits must be entered to transfer the telephone call. For example, in many cases at least 10 digits will have to be entered. Dialing numerous digits in this manner can be cumbersome and prone to error.

Line 63, should read:

The present invention can also incorporate a network capability to provide a transferring party with a list of possible transfer numbers from which the transferring party can select the desired transfer telephone number. This gives the transferring party increased flexibility while still maintaining control over the transfer of the telephone call. Thus the present invention provides an efficient and flexible telephone transfer service that is easier to use and more secure than conventional systems.

Column 3,
Line 39, should read:

In another embodiment, the present invention is a system for performing an efficient transfer of a telephone call. The system includes a first switch that couples a calling party telephone to a PSTN and a second switch that couples a called party telephone to a PSTN, wherein a telephone call can be established from the calling party to the called party over the PSTN through the first switch and the second switch. A network element containing service logic, such as an application server (AS) or service control point (SCP) is coupled to one of the first and second switches. A database is coupled to the SCP. The database comprises a subscriber information table. Preferably, the subscriber information table comprises a first column and a second column, wherein the first column is used to store a subscriber identification and the second column is used to store a transfer telephone number assocciated with the subscriber identification. The SCP is adapted to receive a query for a transfer telephone number from a one of the first and second switches and determine a transfer telephone number to return to the one of the first and second switches in response to the query.

UNITED STATES PATENT AND TRADEMARK OFFICE
CERTIFICATE OF CORRECTION

PATENT NO. : 6,853,718 B1
DATED : February 8, 2005
INVENTOR(S) : Bedingfield, Sr. et al.

It is certified that error appears in the above-identified patent and that said Letters Patent is hereby corrected as shown below:

Column 6,
Line 59, should read:

The first embodiment of the present invention is limited in the sense that the hook flash begins a series of events that automatically lead to the call being transferred to the transfer number. As a result, services that require additional actions by the calling party after the hook flash, such as entering a telephone number, cannot be provided according to the first embodiment of the present invention. Consequently, the first embodiment of the present invention is useful for subscribers that do not or cannot subscribe to three-way calling.

Column 7,
Line 39, should read:

Having determined that the calling party subscribes to both the efficient transfer service and three-way calling, SCP 218 must determine which of the services the calling party desires. To make this determination, SCP 218 instructs switch 208 to provide a dial tone to the calling party. The dial tone serves to prompt the calling party to enter a code that signifies which service the calling party wishes to use. In one embodiment of the present invention, the code is a star code such as *97 for speed transfer or a valid telephone number corresponding to a third party the calling party wishes to add to the current telephone conversation for three-way calling. Switch 208 receives the code entered by the user and forwards it to SCP 218. SCP 218 analyzes the code entered by the calling party to determine whether the calling party desired speed transfer or three-way calling.

Column 9,
Line 25, should read:

Fig. 3A is an exemplary services node table 319 for mapping area codes or LATA identifier to services node numbers. In one embodiment of the present invention, services node table 319 comprises 2 columns. The first column stores area codes or LATA identifiers. The second column stores the number of the services node that serves the area corresponding to that LATA identifier or area code.

UNITED STATES PATENT AND TRADEMARK OFFICE
CERTIFICATE OF CORRECTION

PATENT NO.     : 6,853,718 B1
DATED          : February 8, 2005
INVENTOR(S)    : Bedingfield, Sr. et al.

It is certified that error appears in the above-identified patent and that said Letters Patent is hereby corrected as shown below:

Column 11,
Line 38, should read:

In an alternative embodiment of the present invention using an ADSI telephone, an ADSI telephone 402b is used. ADSI telephone 402b has a transfer soft button 422 as described above. In addition, ADSI telephone 402b includes a memory 424 for storing a transfer telephone number. A user of ADSI telephone 402b can enter the transfer telephone number into memory 424.

Column 12,
Line 65, should read:

Switch 508 receives the code. In response to the code, switch 508 sends a query to SCP 518 through STP 516. The query includes the calling party number. Using the calling party number, SCP 518 performs a table look up in a subscriber information table 530. SCP 518 retrieves a transfer telephone number corresponding to the calling party number, and returns it to switch 508 with instructions to switch 508 to complete a telephone call to a telephone associated with the transfer telephone number.

Column 15,
Line 28, should read:

Alternatively, the SN plays an announcement asking the user to press a particular key for a particular transfer number. For example, the announcement may be "Dial 1 for mom. Dial 2 for Bob. Dial 3 for Sue."

UNITED STATES PATENT AND TRADEMARK OFFICE
CERTIFICATE OF CORRECTION

PATENT NO. : 6,853,718 B1
DATED : February 8, 2005
INVENTOR(S) : Bedingfield, Sr. et al.

It is certified that error appears in the above-identified patent and that said Letters Patent is hereby corrected as shown below:

<u>Column 19,</u>
Line 26, should read:

18. The method recited in claim 10, wherein the another telephone call processing service in step (e) is establishing a three-way telephone call, further comprising the steps of:
    (f) receiving a valid telephone number in response to the prompting;
    (g) making a telephone call to a telephone associated with the valid telephone number to cause the telephone to ring;
    (h) answering the telephone associated with the valid telephone number; and
    (i) performing a hook flash to complete the three-way telephone call.

Signed and Sealed this

Nineteenth Day of July, 2005

JON W. DUDAS
*Director of the United States Patent and Trademark Office*